(12) United States Patent
Monro

(10) Patent No.: US 7,689,049 B2
(45) Date of Patent: *Mar. 30, 2010

(54) MATCHING PURSUITS CODING OF DATA

(76) Inventor: Donald Martin Monro, 6, The Lays, Goose Street, Beckington, Somerset BA11 6RS (GB)

( * ) Notice: Subject to any disclaimer, the term of this patent is extended or adjusted under 35 U.S.C. 154(b) by 881 days.

This patent is subject to a terminal disclaimer.

(21) Appl. No.: 11/469,198

(22) Filed: Aug. 31, 2006

(65) Prior Publication Data

US 2008/0056346 A1 Mar. 6, 2008

(51) Int. Cl.
*G06K 9/36* (2006.01)
(52) U.S. Cl. ..................................... 382/232
(58) Field of Classification Search ......... 382/232–233, 382/238–240, 244–251; 375/240.11, 240.18–240.21; 348/395.1, 398.1; 341/50
See application file for complete search history.

(56) References Cited

U.S. PATENT DOCUMENTS

| | | | |
|---|---|---|---|
| 4,168,513 A | 9/1979 | Hains et al. | |
| 4,509,038 A | 4/1985 | Hirano | |
| 4,675,809 A | 6/1987 | Koichiro et al. | |
| 4,908,873 A | 3/1990 | Philbert et al. | |
| 5,218,435 A | 6/1993 | Lim et al. | |
| 5,315,670 A | 5/1994 | Shapiro | |
| 5,321,776 A | 6/1994 | Shapiro | |
| 5,412,741 A | 5/1995 | Shapiro | |
| 5,559,931 A | 9/1996 | Shindou et al. | |
| 5,699,121 A | 12/1997 | Zakhor et al. | |
| 5,748,786 A | 5/1998 | Zandi et al. | |
| 5,754,704 A | 5/1998 | Barnsley et al. | |
| 5,768,437 A | 6/1998 | Monro et al. | |
| 5,819,017 A | 10/1998 | Akeley et al. | |
| 5,873,076 A | 2/1999 | Barr et al. | |
| 5,956,429 A | 9/1999 | Burns | |
| 6,029,167 A | 2/2000 | Evans | |
| 6,052,416 A | 4/2000 | Koga | |
| 6,078,619 A | 6/2000 | Monro et al. | |
| 6,086,706 A | 7/2000 | Brassil et al. | |
| 6,125,348 A | 9/2000 | Levine | |
| 6,144,835 A | 11/2000 | Inoue | |
| 6,208,744 B1 | 3/2001 | Ishige et al. | |
| 6,336,050 B1 | 1/2002 | Amin et al. | |
| 6,434,542 B1 | 8/2002 | Farmen et al. | |
| 6,480,547 B1 | 11/2002 | Chen et al. | |
| 6,556,719 B1 | 4/2003 | Monro | |
| 6,625,213 B2 | 9/2003 | Bottreau et al. | |
| 6,654,503 B1 | 11/2003 | Sudharsanan et al. | |

(Continued)

FOREIGN PATENT DOCUMENTS

EP 0 595 599 A2 5/1994

(Continued)

OTHER PUBLICATIONS

U.S. Appl. No. 11/255,090, filed Oct. 19, 2005, Monro.

(Continued)

*Primary Examiner*—Jose L Couso
(74) *Attorney, Agent, or Firm*—Sterne, Kessler, Goldstein & Fox P.L.L.C.

(57) ABSTRACT

Briefly, in accordance with one embodiment, an approach to employing Matching Pursuits coding of data is described.

108 Claims, 6 Drawing Sheets

U.S. PATENT DOCUMENTS

| | | |
|---|---|---|
| 6,820,079 B1 | 11/2004 | Evans |
| 6,874,966 B2 | 4/2005 | Duqueroie et al. |
| 6,990,145 B2 | 1/2006 | Monro et al. |
| 7,003,039 B2 | 2/2006 | Zakhor et al. |
| 7,079,986 B2 | 7/2006 | Sieracki |
| 7,230,551 B2 | 6/2007 | Moriya et al. |
| 7,508,325 B2 * | 3/2009 | Monro ......................... 341/50 |
| 2002/0069206 A1 | 6/2002 | Bergman et al. |
| 2003/0108101 A1 | 6/2003 | Frossard et al. |
| 2004/0028135 A1 | 2/2004 | Monro |
| 2004/0126018 A1 | 7/2004 | Monro |
| 2004/0165737 A1 | 8/2004 | Monro |
| 2004/0218836 A1 | 11/2004 | Kanatsu |
| 2005/0149296 A1 | 7/2005 | Sieracki |
| 2007/0016414 A1 | 1/2007 | Mehrotra et al. |
| 2007/0030177 A1 | 2/2007 | Monro |
| 2007/0053434 A1 | 3/2007 | Monro |
| 2007/0053597 A1 | 3/2007 | Monro |
| 2007/0053603 A1 | 3/2007 | Monro |
| 2007/0164882 A1 | 7/2007 | Monro |
| 2007/0252733 A1 | 11/2007 | Thebault et al. |
| 2007/0258654 A1 | 11/2007 | Monro |
| 2007/0282933 A1 | 12/2007 | Monro |
| 2007/0290899 A1 | 12/2007 | Monro |
| 2008/0005648 A1 | 1/2008 | Monro |
| 2008/0055120 A1 | 3/2008 | Monro |
| 2008/0084924 A1 | 4/2008 | Monro |
| 2008/0086519 A1 | 4/2008 | Monro |

FOREIGN PATENT DOCUMENTS

| | | |
|---|---|---|
| EP | 0 836 325 A1 | 4/1998 |
| EP | 1 545 010 A1 | 6/2005 |
| EP | 1 610 560 A | 12/2005 |
| GB | 2 293 733 A | 4/1996 |
| GB | 2 409 943 A | 7/2005 |
| WO | WO97/16029 | 5/1997 |
| WO | WO98/11730 | 3/1998 |
| WO | WO99/08449 | 2/1999 |
| WO | WO01/15456 | 3/2001 |
| WO | WO01/63935 | 8/2001 |
| WO | WO02/13538 | 2/2002 |
| WO | WO2004/051863 | 6/2004 |
| WO | WO2005/027049 | 3/2005 |
| WO | WO 2005/064799 | 7/2005 |
| WO | WO 2005/067661 | 7/2005 |
| WO | WO2005/119581 | 12/2005 |
| WO | WO2007/030702 | 3/2007 |
| WO | WO2007/030784 | 3/2007 |
| WO | WO2007/030785 | 3/2007 |
| WO | WO2007/030788 | 3/2007 |
| WO | WO 2007/084336 | 7/2007 |
| WO | WO 2007/118220 | 10/2007 |
| WO | WO 2007/145875 | 12/2007 |
| WO | WO 2007/149358 | 12/2007 |
| WO | WO 2007/149383 | 12/2007 |
| WO | WO 2007/149384 | 12/2007 |
| WO | WO 2008/027450 | 3/2008 |
| WO | WO 2008/030426 | 3/2008 |
| WO | WO/2008/045280 | 4/2008 |
| WO | WO/2008/045281 | 4/2008 |

OTHER PUBLICATIONS

Monro et al., "Bases for Low Complexity Matching Pursuits Image Coding" www.http://dmsun4.bath.ac.uk, Sep. 2005.

Yuan et al., "Improved Matching Pursuits Image Coding" IEEE International Conference on Acoustics, Speech and Signal Processing ICASSP 2005, pp. II-201-204, Mar. 2005.

Monro, "Basis Picking for Matching Pursuits Image Coding" IEEE International Conference on Image Processing, pp. 2495-2498, Sep. 2004.

Yuan et al., "Low Complexity Separable Matching Pursuits" IEEE Int. Conference Acoustics Speech Signal Process, pp. III-725-728, May 2004.

Figueras et al., "Color Image Scalable Coding with Matching Pursuit" IEEE Int. Conference Acoustics Speech Signal Process, pp. III-53-56, May 2004.

Monro et al., "Improved Coding of Atoms in Matching Pursuits" IEEE Int. Conf. Image Process, vol. 2, Sep. 2003.

Frossard et al., "High Flexibility Scalable Image Coding" Proceedings of VCIP 2003, Jul. 2003.

Poh et al., "Comparison of Residual Compression Methods in Motion Compensated Video" IEEE Int. Workshop on Multimedia Signal Processing, pp. 109-112, Dec. 2002.

Moschetti et al., "New Dictionary and Fast Atom Searching Method for Matching Pursuit Representation of Displaced Frame Difference" IEEE International Conference on Image Processing, pp. III-685-688, Sep. 2002.

Neff et al., "Matching Pursuit Video Coding-Part I: Dictionary Approximation" IEEE Trans. Circuits System Video Technology, vol. 12, No. 1, pp. 13-26, Jan. 2002.

Tredwell et al., "A Sequential Vector Selection Algorithm for Controllable Bandwidth Motion Description Encoding" IEEE Sympos. Intell. Multimedia. Video & Speech Process, May 2001.

Czerepinski et al., "Matching Pursuits Video Coding: Dictionaries and Fast Implementation" IEEE Trans Circuit Systems Video Technology, vol. 10, No. 7, pp. 1103-1115, Oct. 2000.

Monro et al., "Visual Embedding of Wavelet Transform Coefficients" IEEE International Conference Image Process, pp. 186-189, Sep. 2000.

Neff et al., "Very Low Bit-Rate Video Coding Based on Matching Pursuits" IEEE Trans. Circuits and Systems for Video Tech., vol. 7, No. 1, pp. 158-171, Feb. 1997.

Mallat et al., "Matching Pursuits with Time-Frequency Dictionaries" IEEE Trans. Signal Processing, vol. 41, No. 12, pp. 3397-3415, Dec. 1993.

Steffen et al., "Theory of Regular $M$-band Wavelet Bases" IEEE Transactions on Signal Processing, vol. 41, No. 12, pp. 3497-3511, Dec. 1993.

Shapiro, "Embedded Image Coding Using Zerotrees of Wavelet Coefficients" IEEE Transactions on Signal Processing, vol. 41, No. 12, pp. 3445-3462, Dec. 1993.

Ramchandran et al., "Best Wavelet Packet Bases in a Rate-Distortion Sense" IEEE Transactions on Signal Processing, vol. 2, No. 2, pp. 160-175, Apr. 1993.

Mallat, "A Theory for Multiresolution Signal Decomposition: The Wavelet Representation" IEEE Trans. Pattern Anal. Mach. Intel., vol. 11, No. 7, Jul. 1989.

Daubechies, "Orthonormal Bases of Compactly Supported Wavelets" Comm. Pure Appl. Math., vol. 41, pp. 909-996, 1988.

Brin et al., Copy detection mechanisms for digital documents, Proceedings of the 1995 ACM SIGMOD international conference on Management of data SIGMOD '95, vol. 24 ACM Press, May 1995, pp. 398-409.

Cancedda et al., Word Sequence Kernels, Mar. 2003, MIT Press, Journal of Machine Learning Research, vol. 3 Special Edition, pp. 1059-1082.

Cover et al. "Elements of Information Theory" Copyright Jon Wiley & Sons, Inc., p. 96, 1991.

De Natale, et al., "A Mesh-Interpolation Scheme for Very-Low Bitrate Coding of Video Sequences" European Transactions on Telecommunications, vol. 9, No. 1, pp. 47-55, 1998.

De Vleeschouwer et al., "Subband dictionaries for low-cost matching pursuits of video residues," IEEE Transactions on Circuits and Systems for Video Technology, vol. 9, Issue 7, pp. 984-993, Oct. 1999.

Gamito et al. "Lossles Coding of Floating Point Data with JPEG 2000 Part 10" Proceedings of the SPIE, SPIE, Bellingham, VA, US. vol. 5558, Aug. 2, 2004. pp. 276-287.

Golomb, S.W., "Run-length encodings" IEEE Trans Info Theory, Jul. 1966, 12(3):399-401.

Horst et al. "Mupcos: A multi-purpose coding scheme" Signal Processing: Image Communication 5, pp. 75-89, 1993.

Hosang, M., "A Character Elimination Algorithm for Lossless Data Compression" Data Compression Conference, Proceedings. DCC, IEEE Computer Society Press, Los Alamitos, CA, US, Apr. 2, 2002, pp. 1-10.

Huffman, David A., "A Method for the Construction of Minimum-Redundancy Codes," Pro. Inst. Radio Eng., 1952, 9 (40), pp. 1098-1101.

Hull, Jonathan J., "Document Image Matching and Retrieval with Multiple Distortion-Invariant Descriptors", International Association for Pattern Recognition Workshop on Document Analysis Systems, Series in Machine Perception and Artificial Intelligence, vol. 14, published by World Scientific Publishing Co. Pte. Ltd. 1995, pp. 379-396.

Jun-peng Bao et al., "A new text feature extraction model and its application in document copy detection" Machine Learning and Cybernetics, 2003, International Conference on Nov. 2-5, 2003 Piscataway, NJ, USA, IEEE, vol. 1, Nov. 2, 2003, pp. 82-87.

Larsson, N. J., "The Context Trees of Block Sorting Compression" In Proceedings of the IEEE Data Compression Conference, Snowbird, Utah, Mar. 30-Apr. 1, pp. 189-198. IEEE Computer Society Press, 1998.

Monro et al., "Alignment Blur in Coherently Averaged Images" IEEE Transactions on Signal Processing, vol. 4, No. 6, pp. 1596-1601, Jun. 1996.

Said et al., "A New, Fast, and Efficient Image Codec Based on Set Partitioning in Heirarchical Trees" IEEE Transactions on Circuits and Systems for Video Technology, vol. 6, No. 3, pp. 243-250, Jun. 1996.

Sayood, Khalid, "Introduction to Data Compression" Morgan Kaufmann Publishers Inc., San Francisco, CA, USA 1996, pp. 27-32.

Sayood, Khalid, "Introduction to Data Compression" Morgan Kaufmann Publishers Inc., San Francisco, CA, USA 1991, pp. 98-99.

Salomon, "Data Compression: the complete reference", Springer, pp. 32-33, 1998.

Schleimer et al., Data security protection: Winnowing: local algorithms for document fingerprinting, 2003 ACM SIGMOD international conference on Management of data (SIGMOD '03), ACM Press, Jun. 2003, pp. 76-85.

Teuhola, J. "A Compression Method for Clustered Bit-Vectors" Information Processing Letters, Amsterdam, NL, vol. 7, No. 6, pp. 308-311, Oct. 1978.

Tian et al., "Image Data Processing in the Compressed Wavelet Domain" Proceedings of ICSP'96, pp. 978-981, 1996.

Trott et al. "Wavelets Applied to Lossless Compression and Progressive Transmission of Floating Point Data in 3-D Curvilinear Grids" IEEE Proceedings of the Visualization Conference, Oct. 27, 1996, pp. 385-388.

Donald Monro, U.S. Appl. No. 11/677,515, filed Feb. 21, 2007, entitled "Hierarchical Update Scheme for Extremum Location with Indirect Addressing".

Donald Monro, U.S. Appl. No. 11/678,004, filed Feb. 22, 2007, entitled, "Video Coding With Motion Vectors Determined by Decoder".

Donald Monro, U.S. Appl. No. 11/678,479, filed Feb. 23, 2007, entitled, "Video Coding With Embedded Motion".

Donald Monro, U.S. Appl. No. 11/777,256, filed Jul. 11, 2007.

Donald Monro, U.S. Appl. No. 11/677,511, filed Feb. 21, 2007, entitled "Hierarchical Update Scheme for Extremum Location".

Donald Monro, U.S. Appl. No. 11/777,239, filed Jul. 12, 2007.

Donald Monro, U.S. Appl. No. 11/777,230, filed Jul. 12, 2007.

Donald Monro, U.S. Appl. No. 11/777,130, filed Jul. 12, 2007.

Donald Monro, U.S. Appl. No. 11/777,144, filed Jul. 12, 2007.

Donald Monro, U.S. Appl. No. 11/777,122, filed Jul. 12, 2007.

Donald Monro, U.S. Appl. No. 11/777,100, filed Jul. 12, 2007.

Donald Monro, U.S. Appl. No. 11/777,081, filed Jul. 12, 2007.

Donald Monro, U.S. Appl. No. 11/777,022, filed Jul. 12, 2007.

Donald Monro, U.S. Appl. No. 11/776,786, filed Jul. 12, 2007.

Donald Monro, PCT Serial No. PCT/US2007/008861, filed Apr. 9, 2007, entitled "Motion Assisted Data Enhancement".

Donald Monro, PCT Serial No. PCT/US2008/002100, filed Feb. 19, 2008, entitled "Hierarchical Update Scheme for Extremum Location".

Donald Monro, PCT Serial No. PCT/US2008/002101, filed Feb. 19, 2008, entitled "Hierarchical Update Scheme for Extremum Location with Indirect Addressing".

International Search Report for Appln. No. PCT/US2007/013100 issued Jan. 14, 2008, 4pgs.

International Search Report for Appln. No. PCT/US2007/000759 issued Feb. 14, 2008, 7pgs.

International Search Report for Appln. No. PCT/US2007/014138 issued Oct. 29, 2007, 2 pgs.

International Search Report for Appln. No. PCT/US2007/014182 issued Jan. 18, 2008, 1 pg.

International Search Report for Appln. No. PCT/US2007/014181 issued Jan. 14, 2008.

Non-Final Office Action for U.S. Appl. No. 11/255,090, completed Feb. 2, 2008, mailed Feb. 6, 2008, 14pgs.

Non-Final Office Action for U.S. Appl. No. 11/332,777, completed Dec. 12, 2007, mailed Dec. 21, 2007, 4pgs.

Final Office Action for U.S. Appl. No. 11/425,142, completed Sep. 10, 2007, mailed Sep. 18, 2007, 9 pgs.

Non-Final Office Action for U.S. Appl. No. 11/425,142, completed Mar. 7, 2007, mailed Mar. 20, 2007, 8 pgs.

Non-Final Office Action for U.S. Appl. No. 11/470,611, completed Aug. 29, 2007, mailed Sep. 5, 2007, 6 pgs.

Written Opinion for Appln. No. PCT/US2007/000759 completed Feb. 14, 2007, mailed Feb. 25, 2008, 11pgs.

International Search Report for Appln. No. PCT/US2007/019034 issued Apr. 8, 2008, 2pgs.

Written Opinion for Appln. No. PCT/US2007/019034 completed Mar. 31, 2008, mailed Apr. 8, 2008, 7pgs.

Non-Final Rejection for U.S. Appl. No. 11/470,611, mailed on Jun. 30, 2008, 5 pgs.

Non-Final Rejection for U.S. Appl. No. 11/422,316, mailed on Jul. 3, 2008, 7 pgs.

Final Office Action for U.S. Appl. No. 11/332,777, mailed Aug. 13, 2008, 5 pgs.

Final Office Action for U.S. Appl. No. 11/255,090, mailed Sep. 3, 2008, 11 pgs.

Non-Final Office Action for U.S. Appl. No. 11/425,142, mailed Sep. 16, 2008, 12 pgs.

Choog Soo Park et al., "Lost Motion Vector Recovery Algorithm," Circuits and Systems, IEEE International Symposium on London, vol. 3, 1994, pp. 229-232.

International Search Report for Appln. No. PCT/US2008/002179, issued Aug. 20, 2008, 12 pgs.

Non-Final Office Action for U.S. Appl. No. 11/255,090, dated Dec. 15, 2008, 11 pgs.

International Search Report and Written Opinion for Appln. No. PCT/US2008/002101, dated Dec. 12, 2008, 13 pgs.

Cotter et al., "Application of Tree-Based Searches to Matching Pursuit," 2001 IEEE International Conference on Acoustics, Speech and Signal Processing, New York, NY, vol. 6, 7, May 2001, pp. 3933-3936.

Shoa et al., "Tree Structure Search for Matching Pursuit," Image Processing, 2005, vol. 3, 11, pp. 908-911.

Qiangsheng Liu et al., "A low-cost video encoder with matching pursuit," Intelligent Multimedia, Video and Speech Processing, May 2, 2001, pp. 502-505.

Yuan Yuan et al., "Improved Matching Pursuits Image Coding," Acoustics, Speech, and Signal Processing, 2005, vol. 2, 18, pp. 201-204.

International Search Report and Written Opinion for Appln. No. PCT/US2008/002100, dated Dec. 12, 2008, 14 pgs.

International Search Report for Appln. No. PCT/US2007/021302, dated Dec. 10, 2008, 5 pgs.

Haoxing Zhang et al., "A Hybrid Video Coder Based on H.264 with Matching Pursuits," Acoustics, Speech and Signal Processing, 2006, p. 889.

Yuan et al., "3D Wavelet Video Coding with Replicated Matching Pursuits," Sep. 11, 2005, Image Processing, pp. 69-72.

Monro et al., "Subband Adaptive Dictionaries for Wavelet/Matching Pursuits Image Coding," Oct. 8, 2006, Image Processing, p. 2136.

Chien-Kai et al., "Matching Pursuits Low Bit Rate Video Coding with Codebooks Adaptation," Jun. 5, 2000, Acoustics, Speech, and Signal Processing, pp. 408-411.

International Search Report for Appln. No. PCT/US2007/021303, dated Dec. 12, 2008, 5 pgs.

Rabiee et al., "Scalable Subband Image Coding with Segmented Orthogonal Matching Pursuit," Oct. 4, 1998, Image Processing, pp. 774-777.

Rabiee et al., "Low-bit-rate Subband Image Coding with Matching Pursuits," Visual Communications and Image Processing, vol. 3309, 1998, pp. 875-880.

Schmid-Saugeon et al., "Dictionary Design for Matching Pursuit and Application to Motion-Compensated Video Coding," 2004, IEEE Transactions on Circuits and Systems for Video Technology, pp. 880-886.

International Search Report for Appln. No. PCT/US2007/019297, dated Dec. 12, 2008, 5 pgs.

Non-Final Office Action for U.S. Appl. No. 11/422,316, mailed Dec. 4, 2008, 13 pgs.

Non-Final Office Action for U.S. Appl. No. 11/255,090, mailed Dec. 15, 2008, 15 pgs.

Non-Final Office Action for U.S. Appl. No. 11/332,777, mailed Feb. 25, 2009, 6 pgs.

Final Office Action for U.S. Appl. No. 11/425,142, mailed Mar. 2, 2009, 18 pgs.

International Search Report for Appln. No. PCT/US2007/014181 issued Jan. 23, 2008, 1 pg.

David Salomon, "Data Compression: The Complete Reference," 1998, Springer, XP002464409, pp. 32-33.

Non-Final Office Action for U.S. Appl. No. 11/677,511, mailed Feb. 20, 2009, 23 pgs.

Non-Final Office Action for U.S. Appl. No. 11/677,515, mailed Feb. 25, 2009, 21 pgs.

\* cited by examiner

| Picked No k | Width d $2w_k + 1$ | Frequency d $f_k$ | Phase (*π/4) | Attenuation $\sigma_k$ |
|---|---|---|---|---|
| 1 | 1 | 0 | 0 | 1 |
| 2 | 5 | 0 | 0 | 8 |
| 3 | 9 | 3 | 1.5 | 2 |
| 4 | 9 | 0 | 0 | 24 |
| 5 | 9 | 1 | 1 | 2 |
| 6 | 3 | 1 | 0 | 2 |
| 7 | 5 | 1 | 2 | 1 |
| 8 | 3 | 0 | 0 | 12 |
| 9 | 7 | 2 | 1.5 | 12 |
| 10 | 7 | 1 | 1.5 | 4 |
| 11 | 7 | 0 | 0 | 12 |
| 12 | 5 | 2 | 0 | 12 |
| 13 | 9 | 1 | 2 | 8 |
| 14 | 5 | 1 | 1 | 24 |

FIG. 4

| | | | | | | | | | | | | | |
|---|---|---|---|---|---|---|---|---|---|---|---|---|---|
| 1 | 25 | 0 | 26 | 71 | 13 | 90 | 7 | 108 | 0 | 2 | 56 | 29 | 44 |
| 3 | 110 | 0 | 0 | 38 | 0 | 0 | 0 | 0 | 0 | 0 | 0 | 60 | 67 |
| 77 | 0 | 0 | 99 | 0 | 16 | 0 | 102 | 95 | 0 | 0 | 0 | 63 | 113 |
| 11 | 114 | 0 | 35 | 72 | 0 | 0 | 0 | 0 | 116 | 0 | 105 | 0 | 73 |
| 59 | 69 | 96 | 103 | 34 | 6 | 22 | 111 | 43 | 91 | 0 | 36 | 39 | 68 |
| 5 | 0 | 8 | 100 | 12 | 0 | 23 | 46 | 28 | 70 | 40 | 27 | 101 | 21 |
| 4 | 0 | 42 | 0 | 0 | 10 | 0 | 107 | 104 | 14 | 0 | 78 | 0 | 83 |
| 19 | 0 | 0 | 0 | 0 | 15 | 0 | 0 | 87 | 0 | 37 | 93 | 0 | 50 |
| 18 | 0 | 76 | 0 | 0 | 89 | 0 | 106 | 0 | 0 | 0 | 98 | 79 | 92 |
| 0 | 0 | 0 | 118 | 0 | 30 | 9 | 0 | 53 | 0 | 0 | 85 | 58 | 41 |
| 112 | 119 | 0 | 109 | 88 | 24 | 115 | 117 | 0 | 0 | 66 | 61 | 94 | 0 |
| 17 | 0 | 54 | 0 | 0 | 74 | 49 | 0 | 64 | 0 | 0 | 62 | 45 | 82 |
| 20 | 0 | 97 | 0 | 0 | 65 | 94 | 0 | 33 | 0 | 0 | 48 | 80 | 55 |
| 32 | 0 | 51 | 0 | 0 | 81 | 86 | 47 | 57 | 0 | 0 | 75 | 31 | 52 |

Table 2

FIG. 5

MATCHING PURSUITS CODING OF DATA

FIELD

This application pertains to the field of coding data, and more particularly, to the field of selection of bases for coding data using transforms and/or matching pursuits.

BACKGROUND

Digital data for various forms of content, such as, without limitation, digital images, digital video, and/or audio information, is delivered today via wireless transmission networks, digital satellite services, streaming video and/or audio over the Internet and more. For example, again, without limitation, delivering video and/or audio content in a digital data form to personal digital assistants, cellular phones and/or other devices is continuing to increase in popularity. Therefore, a need continues for data compression and decompression techniques to allow efficient transmission and storage of digital data, regardless of the content the data represents.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description if read with the accompanying drawings in which:

FIG. 4 is a table of example bases provided for illustration purposes.

FIG. 5 is a table with an example mask provided for illustration purposes.

DETAILED DESCRIPTION

Figure 1:
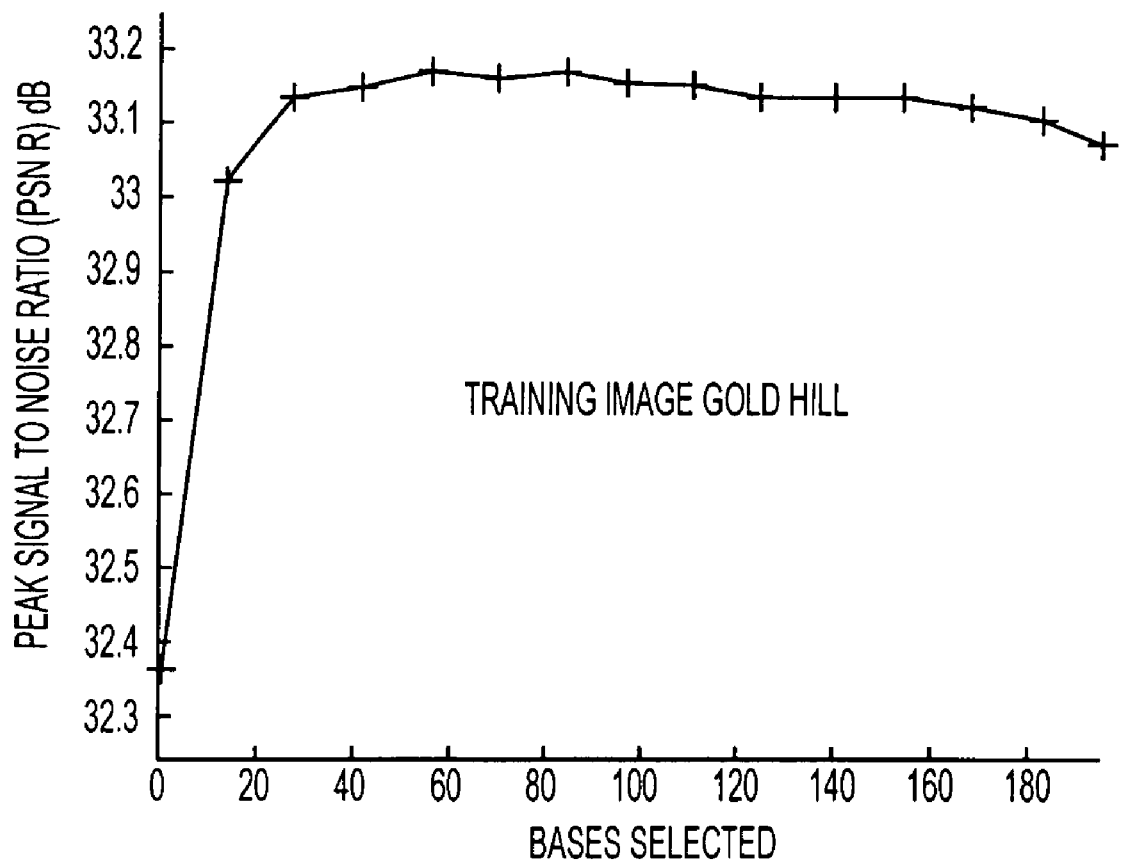
FIGS. 1-3 are plots illustrating sample results from applying an MP process to code data.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Some portions of the detailed description which follow are presented in terms of algorithms and/or symbolic representations of operations on data bits and/or binary digital signals stored within a computing system, such as within a computer and/or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing may involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

Matching pursuits processes may be used to compress one dimensional or multi-dimensional data, including but not limited to: still images, audio, video, and/or digital images. A matching pursuits process may include finding a full inner product between a signal to be coded and members of a dictionary of basis functions. At a position of an inner product, a dictionary entry giving an inner product may describe the signal locally. This may be the maximum inner product over all or part of the signal. This may be referred to as an "Atom." Amplitude may be quantized, and position, quantized amplitude, sign, and dictionary number may be combined to form a code describing a particular Atom, for example. For one embodiment, quantization may be performed using a precision limited quantization method. Other embodiments may use other quantization techniques. Claimed subject matter is not limited in scope to any particular quantization method or technique. All potential quantization methods now known or to be developed are intended to be included.

In one particular embodiment, an Atom is subtracted from a signal giving a residual. The signal may be completely and/or partially described by the Atom plus the residual. The process may be repeated with new Atoms successively found and subtracted from the residual. At any stage, the signal may be completely described by the codes of the Atoms found and the remaining residual.

Matching pursuits (MP), therefore, may decompose any signal f into a linear expansion of waveforms that may belong to a redundant dictionary $D=\phi\{\gamma\}$ of basis functions, such that $$f = \sum_{n=0}^{m-1} a_n \varphi_{\gamma_n} + R^m f$$

where $R^m f$ is the $m^{th}$ order residual vector after approximating f by m 'Atoms' and $$a_n = \langle \phi_{\gamma_n}, R^n f \rangle$$

is an inner product at stage n of a dictionary with an $n^{th}$ order residual, for this particular embodiment.

For some embodiments, a dictionary of basis functions may comprise two-dimensional bases. Other embodiments may use dictionaries comprising one-dimensional bases which may be applied separably to form two-dimensional bases. To do this, a selected basis function may be applied to a set of data in one of its dimensions and another basis function may subsequently be applied in another dimension, the remaining dimension if there are two dimensions. A dictionary of b basis functions in one dimension may provide $b^2$ combinations which form a dictionary of $b^2$ basis functions in two dimensions, for example. This may likewise be extended to any number of dimensions. Therefore, in this context, the term "separably" includes applying different basis functions to data separately.

As described in more detail hereinafter, a method is described which may reduce complexity of a codebook to be applied to coding of multi-dimensional data. Likewise, improved representation of the data may also at times occur. In this particular embodiment, a dictionary of n dimensional bases may be formed separably, as described above, for example, from a set of previously determined 1D bases, although, of course, claimed subject matter is not limited in scope in this respect. A subset of a full n dimensional dictionary may be selected for coding data. In one particular embodiment, although claimed subject matter is not limited in scope in this respect, this may be implemented using a mask to select a subset of a full dictionary. For images, as one example, for a range of numbers of selected bases for a bit rate, a PSNR may, at times, provide improved results in comparison with a full 2D codebook. As described in more detail hereinafter, results with sparse dictionaries, therefore, may have lower computational cost while maintaining data integrity to a high degree.

As is known, a dictionary may play a role in terms of speed for a particular method or process of compression. See, for example, Monro, D. M., "Basis Picking for Matching Pursuits Image Coding", IEEE International Conference on Image Processing (ICIP 2004), Singapore, September 2004; Yuan Yuan and Monro., D. M., "Improved Matching Pursuits Image Coding", IEEE International Conference on Acoustics, Speech and Signal Processing ICASSP 2005, Philadelphia, March 2005. However, a dictionary may also play a role in complexity and accuracy, as explained in more detail hereinafter.

For example, if the number of 1D bases is b and the basis width or 'footprint' is $d=(2w_k+1)$, then in 2D there are $b^2$ bases. One aspect of a MP process includes repairing or updating inner products in a region of an Atom that has been removed from the data. This may involve calculation of inner products in a $dxd=d^2$ region of the image. Even if done separably, one desire to compute inner products in a first dimension with bases in a 1D region of extent 2d-1 for b bases of width d, at a computational cost of order $bd^2$ followed by inner products in a second dimension in a 2D region of extent 2d-1 by 2d-1 for b results of the first stage, using b bases of width d, at a computational cost of order $b^2d^3$. In this example, therefore, the second stage is more complex. In higher dimensions, the gain has the potential to be greater since complexity in n dimensions may be proportional to $b^N d^{N+1}$.

In general, a large codebook may give a greater accuracy for a particular number of Atoms selected; however, it may also employ more bits to code an Atom from a larger codebook. Therefore, at a selected bit rate, for example, it may not give the greatest accuracy. As is well-known, reducing the codebook size by half may reduce the bit cost of coding an Atom by 1 bit in the case where all bases are equally likely. More particularly, the cost of coding any of n equally probable symbols is well-known to be $\log_2 N$. Although typically probabilities of occurrence of the bases will, in general, not be equal, a similar effect may occur if the probabilities do not vary widely. Thus, a reduction in the cost of coding may occur as dictionary size is reduced. By trimming an n dimensional codebook, one may accomplish a beneficial rate/distortion trade-off, e.g., a lower distortion at a given rate or a lower bit rate for a given distortion.

In one particular embodiment, a reduced dictionary may be implemented as a mask applied to a full n dimensional dictionary by indicating which bases are to be applied. By referring to this mask, bases from a separable codebook may be selected to perform inner product calculations in a Matching Pursuits (MP) process, or applied to the data in other coding applications. For such an embodiment, while all bases may in some embodiments be considered in a first stage operation of separable computation, not all combinations are used in the second dimension, and fewer still are used in higher dimensions, potentially reducing the number of calculations. This complexity reduction has the potential to make computations feasible, especially for higher dimensional coding tasks that previously may not have been feasible. Likewise, in other embodiments, less than all bases may be considered as well in a first operation, for example. These embodiments are merely intended as illustrative examples; however, many other embodiments are intended and contemplated to be including within the scope of claimed subject matter.

A resulting dictionary may be used on a signal, or data that has been transformed, such as by a wavelet transform. Furthermore, a final dictionary may be utilized to code data with an MP process. This process may also be used with other data, including audio, visual, video, multi-dimensional, and/or non-transformed data. Furthermore, a resulting dictionary may be used to code many different types of transformed and/or non-transformed data. Yet further, an embodiment of a method and/or system, for example, within the scope of claimed subject matter, may be utilized to determine resulting dictionaries and/or codebooks for many different types of data coding.

For compression, for example, an MP process may be terminated at some stage and codes for a number of Atoms may stored and/or transmitted by a further coding process. For one embodiment, the further coding process may be a lossless coding process, although claimed subject matter is not limited in scope in this respect. Other embodiments may use other coding techniques, including non-lossless coding techniques, for example.

Therefore, as will become clearer, not every basis is necessarily effective for image coding in a separable basis dictionary for Matching Pursuits (MP), so that a subset of bases may, in some instances, provide improved PSNR while also reducing computational complexity.

To provide further background, MP was introduced by Mallat and Zhang for digital audio. See, for example, S. G. Mallat and Z. Zhang, "Matching pursuits with time frequency dictionaries", IEEE Trans. Signal Processing, vol. 41, pp. 3397-3415, December 1993. Later, Neff and Zakhor applied MP to achieve improved low bit rate video coding for motion compensated residual images within an H.263 video codec. See R. Neff and A. Zakhor "Very low bit rate video coding based on matching pursuits", IEEE Trans. Circuits Syst. Video Techol., vol. 7, pp. 158-171, February 1997. Likewise, in, for example, Y. Yuan and D. M. Monro, "Improved Matching Pursuits Image Coding", Proc. IEEE Int. Conf. Acoustics, Speech, Signal Process., Philadelphia, March 2005, gains in fidelity accompanied by reductions in complexity were achieved in MP for coding both still images and motion compensated residuals. These advances came from various approaches, such as pre-transformation by wavelet, an embedded coding scheme for MP, and improved dictionaries found by 'basis picking,' see, D. M. Monro, "Basis Picking for Matching Pursuits Image Coding", IEEE Int. Conf. Image Process. Singapore, October 2004.

For this particular embodiment, to illustrate, a hybrid wavelet/MP codec is employed, although claimed subject matter is not limited in scope in this respect. Again, this is merely provided as an illustrative example. For coding, a multi-scale wavelet decomposition, for example, may be applied using the well-known bi-orthogonal 9/7 filter bank before MP approximation, although, of course, claimed subject matter is not limited in scope in this respect. It has been shown, for example, that 2 scales for CIF (352×288) residuals and 5 scales for D1 (704×576) still images are a good choice, although, again, this is merely an illustrative example and is not intended to limit the scope of claimed subject matter.

Atoms for MP may be found directly on a 2D wavelet coefficient array using a dictionary of 2D bases. In MP coding, a dictionary of basis functions is typically repeatedly searched for an inner product of largest magnitude within a data set. In 2D, however, it is usual to take a dictionary as a set of 1D bases applied separably, as described above, for example. The bases for this particular embodiment comprise an over-complete, non-orthogonal set of Gabor functions, defined by $$g_k = \left(\exp\left(\frac{-\pi t^2}{\sigma_k}\right)\right)^{0.25} \cos\left(\frac{\pi f_k t}{w_k} + \phi_k\right)$$

where the dictionary index is $k$ and $t \in [-w_k, \ldots, w_k]$.

Maximum width ('footprint')$(2w_k + 1) \in [3, 5, 7, 9, \ldots]$

Basis frequencies $f_k \in [0, 1 \ldots, w_k]$

Phase shifts $\phi_k \in [0, 0.5, 1.0, 1.5, 2)\pi/4]$

Attenuation factors $\sigma_k \in [1, 2, 4, 8, 12, 16, 20, 24]$

FIG. 4 below has a table (Table 1) that lists bases examined in the article, D. M. Monro and Yuan Yuan, "Bases for low complexity matching pursuits image coding", IEEE Int. Conf. Image Process., September 2005, with width d=9. Claimed subject matter is not limited in scope to these bases; however, out of convenience, these are provided here for illustration purposes. The first 8 bases were recommended for coding residual images (e.g., Displaced Frame Difference, DFD or inter-frames) and the 14 bases for still images (e.g., intra frames).

For this particular embodiment, a subset of a full 2D dictionary may be formed. This may be done for this particular embodiment by introducing a mask into the coding process containing a zero value corresponding to a basis that is not used. Beginning with a completely zero mask, for example, a basis may be used in turn to code a training set on its own. The basis giving the highest PSNR at a desired bit rate, for example, may be selected as a first unmasked dictionary entry. With a first basis determined, a test set may be coded with combinations of this first basis with one other basis, and the highest in terms of a defined performance measure, for example, may then be added to the dictionary to become the second unmasked entry for further runs, etc. The process may be repeated until the mask is fully populated. The result is a pruned sparse 2D dictionary of every size from 1 to the maximum. This process is similar to the basis picking method for selecting 1D bases, discussed in D. M. Monro, "Basis Picking for Matching Pursuits Image Coding", IEEE Int. Conf. Image Process, Singapore, October 2004, although, of course, claimed subject matter is not limited in scope in this respect.

An example of a mask is given in FIG. 5 (Table 2) below, in which this mask gives the highest average PSNR across a range of bit rates on Gold Hill (BestAvGh), as described below. In the table, the nonzero numerals indicate the order in which the bases were unmasked, so that by reference to it a codebook of size up to 119 may be determined from the table.

Successive basis masking, of course, may be a computationally intensive process. However, in some embodiments, it may be used to design a masked dictionary and, therefore, may be used in many applications after computation, although claimed subject matter is not limited in scope in this respect. With a 14×14 dictionary used for coding still images, for example, selecting a first basis involves coding a training set 196 times. Finding a second basis involves 195 runs and so on, so that the total number of runs in this particular example is 19305. As one example, for still images, the Gold Hill luminance (Y) 704×576 image was used as a training set, similar to how it was used to select the 1D bases in the previously cited article, "Basis Picking for Matching Pursuits Image Coding," although, again this is merely an illustrative embodiment and is not intended to limit the scope of claimed subject matter. For motion compensated residuals (e.g., inter-frames), a residual from the Foreman sequence was used, of size 352×288 pixels.

Figure 2:
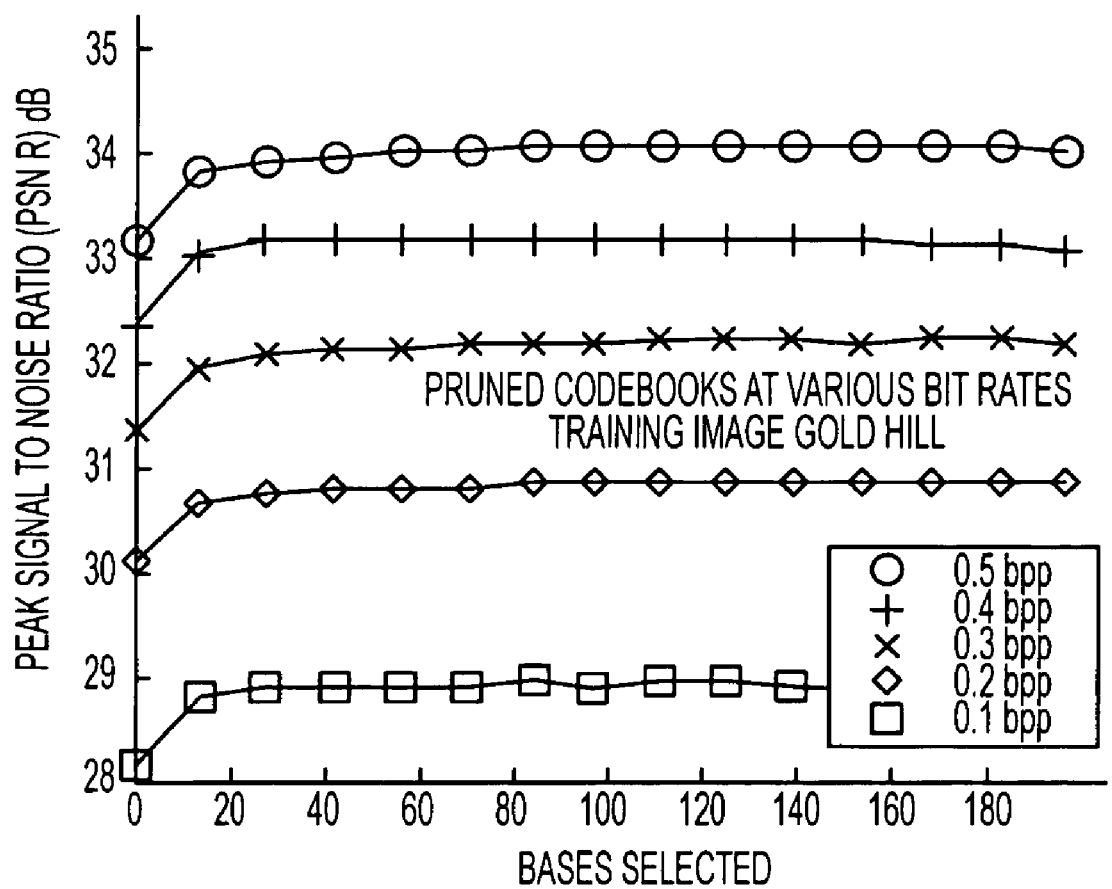
Figure 3:
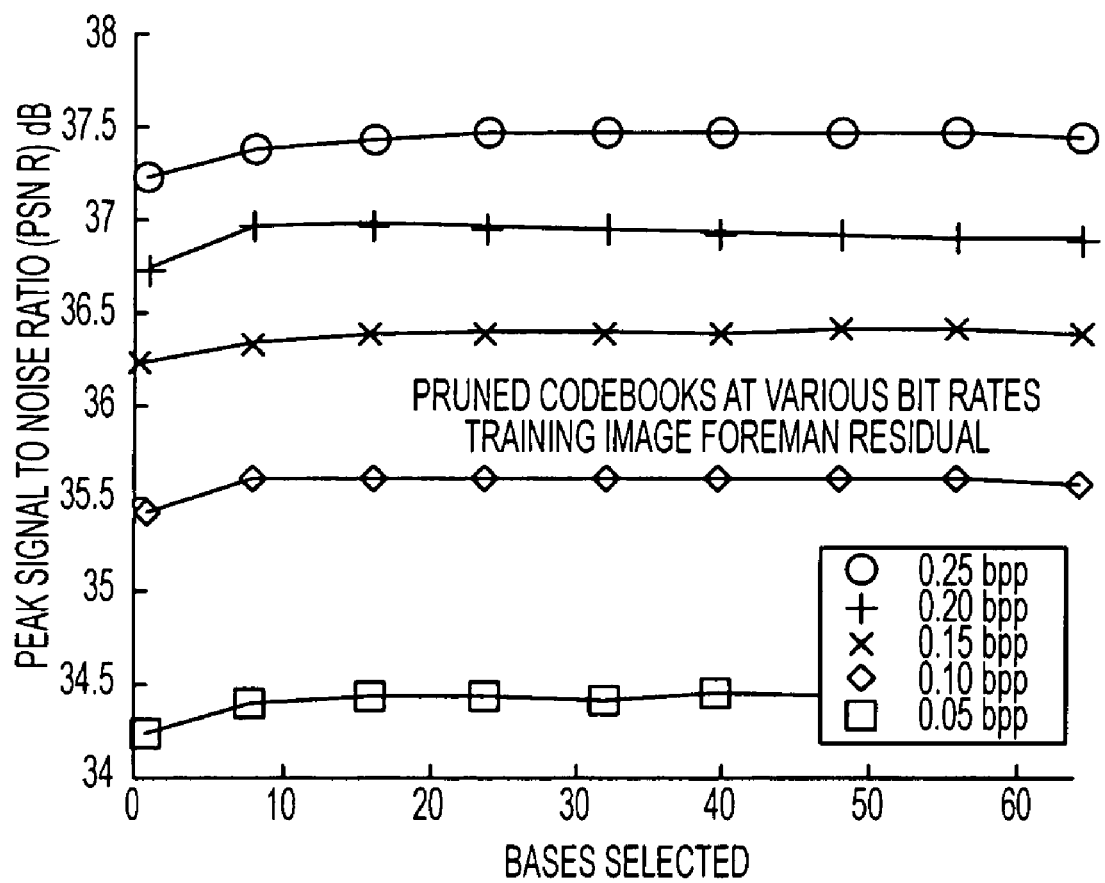

For training still image Gold Hill, FIG. 1 shows the PSNR at a bit rate of 0.4 bits/pixel (bpp) as bases are progressively unmasked. As the codebook grows in size, more bits are employed to code the dictionary entries, so the number of bases coded at a fixed bit rate decreases. The PSNR increases until, with 19 bases, it reaches a value better than the PSNR obtained with a full codebook of 196 bases. It then oscillates about similar values as the codebook size increases by progressive unmasking. The highest PSNR is with 54 bases unmasked. In FIG. 2, similar behavior is shown at a reduced scale for several bit rates. It is seen that the behavior of sparse dictionaries is similar at the other bit rates examined in this example. Likewise, the PSNR declines as the size of a full dictionary is approached. FIG. 3 shows the PSNR as the dictionaries are built for a residual training set, with similar behavior as the bases are unmasked. In these examples, the PSNR obtained using a full codebook is exceeded with a relatively small numbers of bases.

These examples show that a sparse subset of a full 2D separable MP codebook may provide higher PSNR at lower complexity than a full codebook, at least at times. Not surprisingly, masks found at low bit rates tend to work better at low bit rates and those found at high bit rates tend to work better at high bit rates. A masked codebook may in some instances, at least, be found which may provide improved overall PSNR performance.

Of course, as may be appreciated, a dictionary may be described implicitly or explicitly. For example, a functional form or a curve or surface may be specified. Thus, supplying parameters rather than pre-computed basis functions may be employed. A dictionary entry, for example, may be communicated as sampled values of a function. Likewise, a dictionary entry may be communicated as parameters from which a function is capable of being computed. Of course, these are merely examples and claimed subject matter is not limited in scope in this respect.

Likewise, in other alternate embodiments, multiple dimensions, such as three spatial dimensions may be employed. In one such example, a 3D MRI Scan, or a 3D map of the temperature of the ocean or of the atmosphere or of any data or measurement describing a volume may be compressed. Likewise, alternately, a third dimension might be time. Likewise, an embodiment may employ four dimensions, such as, for example, a 3D spatial image and time. More than four dimensions may also be possible as, for example, if there is a relationship between temperature and density plus three spatial dimensions plus time. These are merely illustrative examples and many other embodiments of multiple dimensions are included within the scope of claimed subject matter.

Likewise, in some embodiments, data may comprise multiple dimensions even if they might or might not be formed separable from lower dimensional bases. In this case a subset of all the possible bases might be used and a multiple dimension mask might be used to indicate which bases are used.

In an exemplary embodiment, there is a method for matching pursuits coding of data. The coding includes coding multi-dimensional data using a codebook of basis functions. The codebook includes a subset of a larger multi-dimensional basis dictionary. The larger dictionary includes separable combinations of one or more primary one-dimensional basis function dictionaries. Optionally, the one or more primary one dimensional basis dictionary or dictionaries are communicated to a decoder. A primary dictionary entry may be communicated as sampled values of a function. A primary dictionary entry may be communicated as parameters from which a function is capable of being computed. Further, data indicative of the subset to be used may be communicated to a decoder. The subset may be described by a mask that is applied to a larger dictionary. The subset may be described by data indicative of selected entries of the larger dictionary.

In an embodiment, the data and the dictionary are two dimensional. The two dimensional data may include a digital image. In a further embodiment, the data and the dictionary are three dimensional. Two of the three dimensions may be spatial and the third dimension may be temporal. In addition, the three dimensions may be spatial. In an example, the data and the dictionary are of more than three dimensions. One of the dimensions may be temporal. In a further example, the data dimension may be higher than the codebook dimension and a Matching Pursuits process is applied to lower dimensions of the data. In yet another example, a transform is applied to the data in at least one dimension prior to application of a Matching Pursuits process. The transform may include a wavelet transform. The transform may include a Discrete Cosine Transform.

In an exemplary embodiment, there method for matching pursuits decoding of data. The decoding includes decoding multi-dimensional data using a codebook of basis functions. The codebook includes a subset of a larger multi-dimensional basis dictionary and the larger dictionary including separable combinations of one or more primary one dimensional basis function dictionaries. Optionally, the one or more primary one dimensional basis dictionary or dictionaries are communicated to a coder. A primary dictionary entry may be communicated as sampled values of a function. A primary dictionary entry may be communicated as parameters from which a function is capable of being computed. In an example, data indicative of the subset to be used is communicated to a coder. The subset may be described by a mask that is applied to a larger dictionary. Further, the subset may be described by data indicative of selected entries of the larger dictionary.

In an example, the data and the dictionary are two dimensional. The two dimensional data may include a digital image. The data and the dictionary may be three dimensional. Optionally, two of the three dimensions are spatial and the third dimension is temporal. The three dimensions may be spatial. The data and the dictionary may be of more than three dimensions. One of the dimensions may be temporal. The data dimension may be higher than the codebook dimension and a Matching Pursuits process may be applied to lower dimensions of the data. A transform may be applied to the data in at least one dimension prior to application of a Matching Pursuits process. The transform may include a wavelet transform. The transform may include a Discrete Cosine Transform.

In a further exemplary embodiment, there is an article including a storage medium having stored therein instructions that, if executed, result in coding multi-dimensional data using a codebook of basis functions. The codebook includes a subset of a larger multi-dimensional basis dictionary. The larger dictionary includes separable combinations of one or more primary one dimensional basis function dictionaries. Optionally, the instructions, if executed, may further result in one or more primary one dimensional basis dictionary or dictionaries being communicated to a decoder. The instructions, if executed, may further result in a primary dictionary entry being communicated as sampled values of a function. The instructions, if executed may further result in data indicative of the subset to be used being communicated to a decoder. In an example, the instructions, if executed, further result in the subset being described by a mask that is applied to a larger dictionary. The instructions, if executed, may further result in the subset being described by data indicative of selected entries of the larger dictionary.

In yet another example, the is an article including a storage medium having stored therein instructions that, if executed, result in decoding multi-dimensional data using a codebook of basis functions. The codebook includes a subset of a larger multi-dimensional basis dictionary. The larger dictionary includes separable combinations of one or more primary one dimensional basis function dictionaries. The instructions, if executed, may further result in the one or more primary one dimensional basis dictionary or dictionaries being communicated to a coder. In an example, the instructions, if executed, may further result in data indicative of the subset to be used being communicated to a coder. Optionally, the instructions, if executed, may further result in the subset being described by a mask that is applied to a larger dictionary. The instructions, if executed, may further result in the subset being described by data indicative of selected entries of the larger dictionary.

Figure 6:
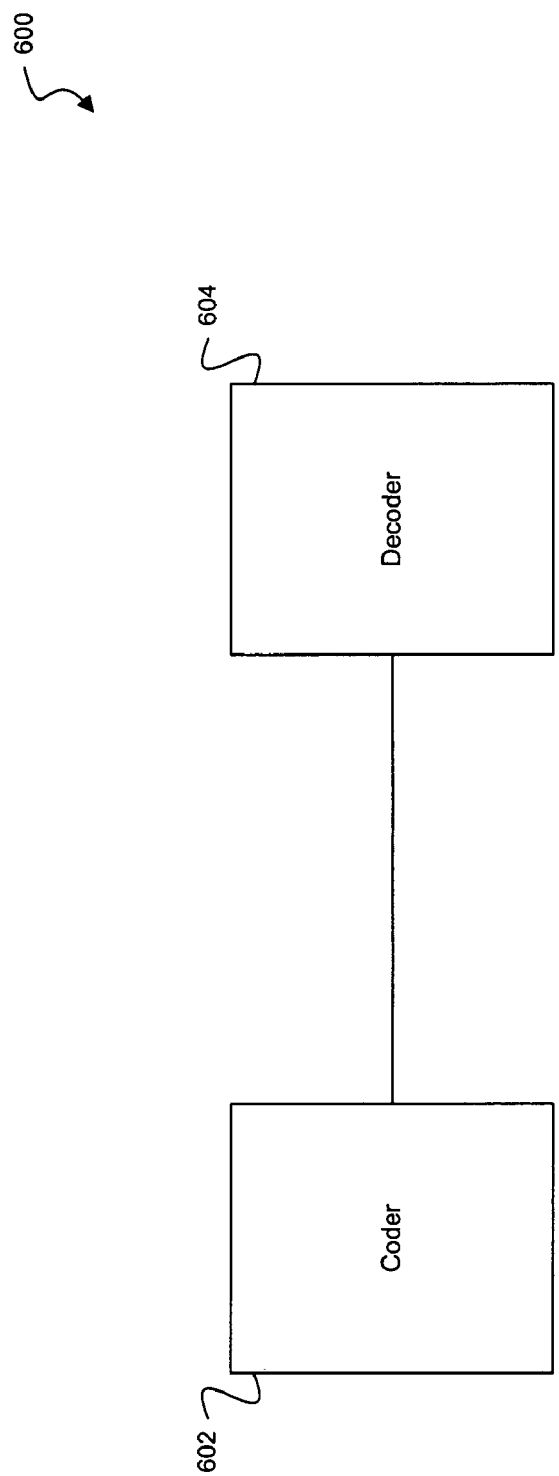
FIG. 6 illustrates an exemplary combination of devices.

It will, of course, be understood that, although particular embodiments have just been described, the claimed subject matter is not limited in scope to a particular embodiment or implementation. For example, one embodiment may be in hardware, such as implemented to operate on a device or combination of devices, such as a combination of devices 600 including a coder 602 and a decoder 604 as illustrated in FIG. 6, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method, comprising:
   receiving, using a computer, multidimensional data; and
   coding the multidimensional data, using a codebook of basis functions and the computer, wherein the codebook is applied as a mask to a basis function dictionary, and the basis function dictionary comprises separable combinations of one-dimensional basis function dictionaries.

2. The method of claim 1, further comprising:
   sending the one-dimensional basis function dictionaries to a decoder.

3. The method of claim 1, further comprising:
   determining a sampled value from a subset of the basis function dictionary; and
   transmitting the sampled value to a decoder.

4. The method of claim 1, further comprising:
   determining a parameter of the basis function dictionary; and
   transmitting the parameter to a decoder.

5. The method of claim 1, further comprising:
   generating the mask from the codebook; and
   transmitting the mask to a decoder.

6. The method of claim 1, further comprising:
   using two-dimensional data as the multidimensional data; and
   using a two-dimensional basis function dictionary as the basis function dictionary.

7. The method of claim 6, wherein the using two dimensional data comprises using a digital image as the two-dimensional data.

8. The method of claim 1, further comprising:
   using three-dimensional data as the multidimensional data; and
   using a three-dimensional basis function dictionary as the basis function dictionary.

9. The method of claim 8, wherein the using the three-dimensional basis function dictionary comprises using a basis function dictionary having two spatial dimensions and one temporal dimension as the three-dimensional basis function dictionary.

10. The method of claim 8, wherein the using the three-dimensional basis function dictionary comprises using a basis function dictionary having three spatial dimensions as the three-dimensional basis function dictionary.

11. The method of claim 1, wherein the coding the multidimensional data using the codebook comprises using a basis function dictionary having more than three spatial dimensions as the basis function dictionary.

12. The method of claim 11, wherein the coding the multidimensional data using the codebook further comprises using a basis function dictionary having a temporal dimension as the basis function dictionary.

13. The method of claim 1, further comprising:
    using data having more dimensions than a quantity of dimensions of the codebook as the multidimensional data; and
    performing a matching pursuits process on portions of the multidimensional data having dimensions that are substantially equal to or lower in number than a respective codebook dimension.

14. The method of claim 1, further comprising:
    applying a transform to the multidimensional data; and
    performing a matching pursuits process on the multidimensional data.

15. The method of claim 14, wherein the applying comprises using a wavelet transform as the transform.

16. The method of claim 14, wherein the applying comprises using a discrete cosine transform as the transform.

17. The method of claim 1, further comprising:
    storing the multidimensional data.

18. The method of claim 1, wherein the receiving further comprises receiving the multidimensional data from a storage.

19. A method, comprising:
    receiving, using a computer, multidimensional data; and
    decoding the multidimensional data, using a codebook of basis functions and the computer, wherein the codebook is applied as a mask to a basis function dictionary, and wherein the basis function dictionary comprises separable combinations of one-dimensional basis function dictionaries.

20. The method of claim 19, further comprising:
    receiving the one-dimensional basis function dictionaries from a coder.

21. The method of claim 19, further comprising:
    receiving a sampled value of a subset of the basis function dictionary from a coder.

22. The method of claim 19, further comprising:
    receiving a parameter of the basis function dictionary from a coder.

23. The method of claim 19, further comprising:
    receiving the mask generated from the codebook from a coder.

24. The method of claim 19, further comprising:
    using two-dimensional data as the multidimensional data; and
    using a two-dimensional basis function dictionary as the basis function dictionary.

25. The method of claim 24, wherein the using the two-dimensional data comprises using a digital image as the two-dimensional data.

26. The method of claim 19, further comprising:
    using three-dimensional data as the multidimensional data; and
    using a three-dimensional basis function dictionary as the basis function dictionary.

27. The method a claim 26, wherein the using the three-dimensional basis function dictionary comprises using a basis function dictionary having two spatial dimensions and one temporal dimension as the three-dimensional basis function dictionary.

28. The method of claim 26, wherein the using the three-dimensional basis function dictionary comprises using a basis function dictionary having three spatial dimensions as the three-dimensional basis function dictionary.

29. The method of claim 19, wherein the decoding comprises using a basis function dictionary having more than three spatial dimensions as the basis function dictionary.

30. The method of claim 29, wherein the decoding further comprises using a basis function dictionary having a temporal dimension as the basis function dictionary.

31. The method of claim 19, further comprising:
using data having more dimensions than a quantity of dimensions of the codebook as the multidimensional data; and
performing a matching pursuits process on portions of the multidimensional data having dimensions that are substantially equal to or lower in number than a respective codebook dimension.

32. The method of claim 19, further comprising:
applying a transform to the multidimensional data; and
performing a matching pursuits process on the multidimensional data.

33. The method of claim 32, wherein the applying comprises using a wavelet transform as the transform.

34. The method of claim 32, wherein the applying comprises using a discrete cosine transform as the transform.

35. The method of claim 19, further comprising:
storing the multidimensional data.

36. The method of claim 19, wherein the receiving further comprises receiving the multidimensional data from storage.

37. A tangible computer-readable medium having stored thereon computer-executable instructions that, if executed by a computer, causes the computer to perform a method comprising:
receiving multidimensional data; and
coding the multidimensional data using a codebook of basis functions, wherein the codebook is applied as a mask to a basis function dictionary, and wherein the basis function dictionary comprises separable combinations of one-dimensional basis function dictionaries.

38. The computer-readable medium of claim 37, wherein the instructions further cause the computer to:
send the one-dimensional basis function dictionaries to a decoder.

39. The computer-readable medium of claim 37, wherein the instructions further cause the computer to:
determine a sampled value from a subset of the basis function dictionary; and
transmit the sampled value to a decoder.

40. The computer-readable medium of claim 37, wherein the instructions further cause the computer to:
determine a parameter of the basis function dictionary; and
transmit the parameter to a decoder.

41. The computer-readable medium of claim 37, wherein the instructions further cause the computer to:
generate the mask from the codebook; and
transmit the mask to a decoder.

42. The computer-readable medium of claim 37, wherein the instructions further cause the computer to:
use two-dimensional data as the multidimensional data; and
use a two-dimensional basis function dictionary as the basis function dictionary.

43. The computer-readable medium of claim 42, wherein the using the two-dimensional data comprises using a digital image as the two-dimensional data.

44. The computer-readable medium of claim 37, wherein the instructions further cause the computer to:
use three-dimensional data as the multidimensional data; and
use a three-dimensional basis function dictionary as the basis function dictionary.

45. The computer-readable medium of claim 44, wherein the using the three-dimensional basis function dictionary comprises using a basis function dictionary having two spatial dimensions and one temporal dimension as the three-dimensional basis function dictionary.

46. The computer-readable medium of claim 44, wherein the using the three-dimensional basis function dictionary comprises using a basis function dictionary having three spatial dimensions as the three-dimensional basis function dictionary.

47. The computer-readable medium of claim 37, wherein the coding comprises using a basis function dictionary having more than three spatial dimensions as the basis function dictionary.

48. The computer-readable medium of claim 37, wherein the coding further comprises using a basis function dictionary having a temporal dimension as the basis function dictionary.

49. The computer-readable medium of claim 37, wherein the instructions further cause the computer to:
use data having more dimensions than a quantity of dimensions of the codebook as the multidimensional data; and
perform a matching pursuits process on portions of the multidimensional data having dimensions that are substantially equal to or lower in number than a respective codebook dimension.

50. The computer-readable medium of claim 37, wherein the instructions further cause the computer to:
apply a transform to the multidimensional data; and
perform a matching pursuits process on the multidimensional data.

51. The computer-readable medium of claim 50, wherein the applying the transform comprises using a wavelet transform as the transform.

52. The computer-readable medium of claim 50, wherein the applying the transform comprises using a discrete cosine transform as the transform.

53. The computer-readable medium of claim 37, wherein the instructions further cause the computer to:
store the multidimensional data.

54. The computer-readable medium of claim 37, wherein the receiving further comprises receiving the multidimensional data from a storage.

55. A tangible computer-readable medium having stored thereon instructions that, if executed by a computer, cause the computer to perform a method comprising:
receiving multidimensional data; and
decoding the multidimensional data using a codebook of basis functions, wherein the codebook is applied as a mask to a basis function dictionary, and wherein the basis function dictionary comprises separable combinations of one-dimensional basis function dictionaries.

56. The computer-readable medium of claim 55, wherein the instructions further cause the computer to:
receive the one-dimensional basis function dictionaries from a coder.

57. The computer-readable medium of claim 55, wherein the instructions further cause the computer to:
receive a sampled value of a subset of the basis function dictionary from a coder.

58. The computer-readable medium of claim 55, wherein the instructions further cause the computer to:
receive a parameter of the basis function dictionary from a coder.

59. The computer-readable medium of claim 55, wherein the instructions further cause the computer to:
receive the mask generated from the codebook from a coder.

60. The computer-readable medium of claim 55, wherein the instructions further cause the computer to:
use two-dimensional data as the multidimensional data; and use a two-dimensional basis function dictionary as the basis function dictionary.

61. The computer-readable medium of claim 60, wherein the using the two-dimensional data comprises using a digital image as the two-dimensional data.

62. The computer-readable medium of claim 55, wherein the instructions further cause the computer to:
use three-dimensional data as the multidimensional data; and
use a three-dimensional basis function dictionary as the basis function dictionary.

63. The computer-readable medium of claim 62, wherein the using the three-dimensional basis function dictionary comprises using a basis function dictionary having two spatial dimensions and one temporal dimension as the three-dimensional basis function dictionary.

64. The computer-readable medium of claim 62, wherein the using the three-dimensional basis function dictionary comprises using a basis function dictionary having three spatial dimensions as the three-dimensional basis function dictionary.

65. The computer-readable medium of claim 55, wherein the decoding comprises using a basis function dictionary having more than three spatial dimensions as the basis function dictionary.

66. The computer-readable medium of claim 65, wherein the decoding further comprises using a basis function dictionary having a temporal dimension as the basis function dictionary.

67. The computer-readable medium of claim 55, wherein the instructions further cause the computer to:
use data having more dimensions than a quantity of dimensions of the codebook as the multidimensional data; and
perform a matching pursuits process on portions of the multidimensional data having dimensions that are substantially equal to or lower in number than a respective codebook dimension.

68. The computer-readable medium of claim 55, wherein the instructions further cause the computer to:
apply a transform to the multidimensional data; and
perform a matching pursuits process on the multidimensional data.

69. The computer-readable medium of claim 68, wherein the applying the transform comprises using a wavelet transform as the transform.

70. The computer-readable medium of claim 69, wherein the applying the transform comprises using a discrete cosine transform as the transform.

71. The computer-readable medium of claim 57, wherein the instructions further cause the computer to:
store the multidimensional data.

72. The computer-readable medium of claim 57, wherein the receiving further includes receiving the multidimensional data from storage.

73. An apparatus, comprising:
a computer configured to:
receive multidimensional data; and
code the multidimensional data using a codebook of basis functions, wherein the codebook is applied as a mask to a basis function dictionary, and wherein the basis function dictionary comprises separable combinations of one-dimensional basis function dictionaries.

74. The apparatus of claim 73, wherein the computer is further configured to send the one-dimensional basis function dictionaries to a decoder.

75. The apparatus of claim 73, wherein the computer is further configured to:
determine a sampled value from a subset of the basis function dictionary; and
transmit the sampled value to a decoder.

76. The apparatus of claim 73, wherein the computer is further configured to:
determine a parameter of the basis function dictionary; and
transmit the parameter to a decoder.

77. The apparatus of claim 73, wherein the computer is further configured to:
generate the mask from the codebook; and
transmit the mask to a decoder.

78. The apparatus of claim 73, wherein the computer is further configured to:
use two-dimensional data as the multidimensional data; and
use a two-dimensional basis function dictionary as the basis function dictionary.

79. The apparatus of claim 78, wherein the computer is further configured to use the two-dimensional data as the multidimensional data by using a digital image as the two-dimensional data.

80. The apparatus of claim 73, wherein the computer is further configured to:
use three-dimensional data as the multidimensional data; and
use a three-dimensional basis function dictionary as the basis function dictionary.

81. The apparatus of claim 78, wherein the computer is further configured to use the three-dimensional basis function dictionary as the basis function dictionary by using a basis function dictionary having two spatial dimensions and one temporal dimension as the three-dimensional basis function dictionary.

82. The apparatus of claim 78, wherein the computer is further configured to use the three-dimensional basis function dictionary as the basis function dictionary by using a basis function dictionary having three spatial dimensions as the three-dimensional basis function dictionary.

83. The apparatus of claim 73, wherein the computer is further configured to code the multidimensional data by using a basis function dictionary having more than three spatial dimensions as the basis function dictionary.

84. The apparatus of claim 73, wherein the computer is further configured to code the multidimensional data by using a basis function dictionary having a temporal dimension as the basis function dictionary.

85. The apparatus of claim 73, wherein the computer is further configured to:
use data having more dimensions than a quantity of dimensions of the codebook as the multidimensional data; and
perform a matching pursuits process on portions of the multidimensional data having dimensions that are substantially equal to or lower in number than a respective codebook dimension.

86. The apparatus of claim 73, wherein the computer is further configured to:
apply a transform to the multidimensional data; and
perform a matching pursuits process on the multidimensional data.

87. The apparatus of claim 86, wherein the computer is further configured to apply the transform to the multidimensional data by using a wavelet transform as the transform.

88. The apparatus of claim 86, wherein the computer is further configured to apply the transform to the multidimensional data by using a discrete cosine transform as the transform.

89. The apparatus of claim 73, wherein the computer is further configured to:
store the multidimensional data.

90. The apparatus of claim 73, further comprising a storage device to store the multidimensional data coupled to the computer.

91. An apparatus, comprising:
a computer configured to:
receive multidimensional data; and
decode the multidimensional data using a codebook of basis functions, wherein the codebook is applied as a mask to a basis function dictionary, and wherein the basis function dictionary comprises separable combinations of one-dimensional basis function dictionaries.

92. The apparatus of claim 91, wherein the computer is further configured to:
receive the one-dimensional basis function dictionaries from a coder.

93. The apparatus of claim 91, wherein the computer is further configured to:
receive a sampled value of a subset of the basis function dictionary from a coder.

94. The apparatus of claim 91, wherein the computer is further configured to:
receive a parameter of the basis function dictionary from a coder.

95. The apparatus of claim 91, wherein the computer is further configured to:
receive the mask generated from the codebook from a coder.

96. The apparatus of claim 91, wherein the computer is further configured to:
use two-dimensional data as the multidimensional data; and
use a two-dimensional basis function dictionary as the basis function dictionary.

97. The apparatus of claim 96, wherein the computer is further configured to use two-dimensional data as the multidimensional data by using a digital image as the two-dimensional data.

98. The apparatus of claim 91, wherein the computer is further configured to:
use three-dimensional data as the multidimensional data; and
use a three-dimensional basis function dictionary as the basis function dictionary.

99. The apparatus of claim 98, wherein the computer is further configured to use the three-dimensional basis function dictionary by using a basis function dictionary having two spatial dimensions and one temporal dimension as the three-dimensional basis function dictionary.

100. The apparatus of claim 98, wherein the computer is further configured to use the three-dimensional basis function dictionary by using a basis function dictionary having three spatial dimensions as the three-dimensional basis function dictionary.

101. The apparatus of claim 91, wherein the computer is further configured to decode the multidimensional data by using a basis function dictionary having more than three spatial dimensions as the basis function dictionary.

102. The apparatus of claim 101, wherein the computer is further configured to decode the multidimensional data by using a basis function dictionary having a temporal dimension as the basis function dictionary.

103. The apparatus of claim 91, wherein the computer is further configured to:
use data having more dimensions than a quantity of dimensions of the codebook as the multidimensional data; and
perform a matching pursuits process on portions of the multidimensional data having dimensions that are substantially equal to or lower in number than a respective codebook dimension.

104. The apparatus of claim 91, wherein the computer is further configured to:
apply a transform to the multidimensional data; and
perform a matching pursuits process on the multidimensional data.

105. The apparatus of claim 104, wherein the computer is further configured to decode the multidimensional data by using a wavelet transform as the transform.

106. The apparatus of claim 104, wherein the computer is further configured to decode the multidimensional data by using a discrete cosine transform as the transform.

107. The apparatus of claim 91, wherein the computer is further configured to:
store the multidimensional data.

108. The apparatus of claim 91, further comprising a storage device to store the multidimensional data coupled to the computer.

* * * * *

UNITED STATES PATENT AND TRADEMARK OFFICE
CERTIFICATE OF CORRECTION

| | | |
|---|---|---|
| PATENT NO. | : 7,689,049 B2 | Page 1 of 1 |
| APPLICATION NO. | : 11/469198 | |
| DATED | : March 30, 2010 | |
| INVENTOR(S) | : Donald Martin Monro | |

It is certified that error appears in the above-identified patent and that said Letters Patent is hereby corrected as shown below:

Column 4, line 32: Replace "may stored" with -- may be stored --

Column 7, line 20: Replace "there method" with -- there is a method --

Column 8, line 20: Replace "the is" with -- there is --

Column 10, line 53: Replace "The method a claim 26" with -- The method of claim 26 --

Signed and Sealed this
Twenty-fourth Day of April, 2012

David J. Kappos
*Director of the United States Patent and Trademark Office*